United States Patent [19]

Pinnavaia et al.

[11] Patent Number: 5,358,701
[45] Date of Patent: Oct. 25, 1994

[54] PROCESS OF USING LAYERED DOUBLE HYDROXIDES AS LOW TEMPERATURE RECYCLABLE SORBENTS FOR THE REMOVAL OF $SO_x$ FROM FLUE GAS AND OTHER GAS STREAMS

[75] Inventors: Thomas J. Pinnavaia, East Lansing; Jayantha Amarasekera, Inkster, both of Mich.

[73] Assignee: Board of Trustees operating Michigan State University, East Lansing, Mich.

[21] Appl. No.: 976,543

[22] Filed: Nov. 16, 1992

[51] Int. Cl.$^5$ .............................................. C01B 17/00
[52] U.S. Cl. .......................... 423/242.1; 423/244.06; 423/244.07; 423/244.08
[58] Field of Search ................. 502/415; 423/230, 239, 423/241, 242.1, 600, 641, 225, 240 S, 239.1, 244.06, 244.07, 244.08

[56] References Cited

U.S. PATENT DOCUMENTS

| | | | |
|---|---|---|---|
| 3,699,037 | 10/1972 | Annooser et al. | 208/120 |
| 3,796,792 | 3/1974 | Miyata et al. | 423/250 |
| 3,835,031 | 9/1974 | Bertolacini et al. | 208/120 |
| 3,879,523 | 4/1975 | Miyata et al. | 423/250 |
| 3,879,525 | 4/1975 | Miyata et al. | 423/277 |
| 4,153,534 | 5/1979 | Vasalos | 208/120 |
| 4,454,244 | 6/1984 | Woltermann | 502/208 |
| 4,472,363 | 9/1984 | Poller et al. | 423/240 |
| 4,774,212 | 9/1988 | Drezdon | 502/62 |
| 4,867,882 | 9/1989 | O'Neill et al. | 210/684 |
| 5,055,199 | 10/1991 | O'Neill et al. | 210/684 |
| 5,079,203 | 1/1992 | Pinnavaia et al. | 502/84 |
| 5,114,691 | 5/1992 | Pinnavaia et al. | 423/244 |
| 5,114,898 | 5/1992 | Pinnavaia et al. | 502/406 |
| 5,116,587 | 5/1992 | Pinnavaia et al. | 423/244 |
| 5,142,077 | 8/1992 | Martin et al. | 554/76 |

FOREIGN PATENT DOCUMENTS 278535 8/1988 European Pat. Off. .

OTHER PUBLICATIONS

S. L. Suib et al., "Layered Double Hydroxides (LDHs)", Solid State Ionics 26 (1988) 77–86.
Komppa, V., "Dry Adsorption Processes for Removal of $SO_x$ and $NO_x$ in Flue Gases—a review", Paperii ja Puu, 5, 401 to 405 (1986), May.
C. Jorgensen, et al., Environmental Progress, vol. 6, pp. 26–32 (1987), Feb., "Evaluation of Sorbents and Additive for $SO_2$ Removal".
Pinnavaia and Kwon, J. Am. Chem. Soc., 110, 3653 (1988), 25 May, "Pillaring of Layered Double Hydroxides (LOH's) by Polyoxomethalate Anions".
W. T. Reichle, Chemtech, 58 to 63 (1986).
Reichle, J. Catal., 101, 352 to 359 (1986).

Primary Examiner—Gary P. Straub
Assistant Examiner—Timothy C. Vanoy
Attorney, Agent, or Firm—Ian C. McLeod

[57] ABSTRACT

A process for removing noxious sulfur oxides, nitrous oxides, and chlorine from gas streams, particularly from flue gases of coal-burning power plants, using layered double hydroxide (LDH) sorbents are described. The sorbents are particularly useful for $SO_2$ absorption at temperatures in the range 100 to less than 400° C. The $SO_2$ gas absorbs into the hydrotalcite structure as $SO_3^{2-}$ anions by replacing most of the gallery $CO_3^{2-}$ anions. The adsorbed $SO_2$ is driven-off by calcination at elevated temperatures (500° C.) and the LDH sorbents are regenerated by hydrolyzing the calcined product optionally in the presence of $CO_2$ or $CO_3^{2-}$.

12 Claims, 3 Drawing Sheets

PROCESS OF USING LAYERED DOUBLE HYDROXIDES AS LOW TEMPERATURE RECYCLABLE SORBENTS FOR THE REMOVAL OF $SO_x$ FROM FLUE GAS AND OTHER GAS STREAMS

BACKGROUND OF THE INVENTION (1.) Field of the Invention

The present invention relates to a process for removing sulfur oxides from a sulfur oxide-containing gases at relatively low temperatures between about 100° C. and 400° C. In particular, the invention relates to the use of layered double hydroxide (LDH) sorbent compositions in the desulfurization of sulfur-containing gases from the flue gases cold side of coal-burning power plants.

(2.) Prior Art

In fossil-fuel-fired power plants, the sulfur content of the feed coal is oxidized during combustion to sulfur oxides ($SO_2$ and $SO_3$, commonly referred to as "$SO_x$"), which are released through stacks to the atmosphere, and are responsible for deposition as "acid rain". Analyses of flue gas produced by power plants burning coal before desulfurization, show 0.5% -0.2% $SO_2$ and about 0.005% $SO_3$. Control of $SO_x$ emission is mandated by the US Environmental Protection Agency (EPA), and various studies are under way to develop methods for its removal from flue gas streams.

Formation of $SO_x$ in combustion processes can be reduced by modifying the burner design and combustion system, by changing the operating conditions and by using fuels with lower sulfur contents. The most popular and inexpensive method of reducing $SO_x$ emission is the addition of reactive dry sorbents with the fuel. Accordingly at present, $SO_x$ removal is most often accomplished by using lime (CaO) or lime stone ($CaCO_3$). Several other basic sorbents like MgO, ZnO also are found to be effective in removing $SO_x$. For a review on dry sorbents see for example, Komppa, V., "Dry Adsorption Processes for Removal of $SO_x$ and $NO_x$ in Flue Gases—a review," *Paperii ja Puu*, 5, 401 to 405 (1986).

Use of Group 2 (formerly Group IIA) metal oxides such as magnesium and calcium oxides as $SO_x$ sorbents has been disclosed in several patent disclosures and recent examples include U.S. Pat. Nos. 3,835,031 and 3,699,037. Several other metal oxides of varying degrees of effectiveness as $SO_x$ sorbents are described in U.S. Pat. No. 4,153,534 which include oxides such as sodium, scandium, titanium, iron, chromium, molybdenum, manganese, cobalt, nickel, copper, zinc, cadmium, rare earth metals, and lead.

In typical coal-fired power plants the ground sorbent, for example lime or limestone, is added into boilers along with coal or sprayed into towers as a slurry to contact the flue gas. The $SO_2$ reacts with calcium hydroxide to form a calcium sulfite slurry which is then partially oxidized with air to calcium sulfate. In this way the sulfur oxides are retained as harmless solid compounds which can be removed from the stack gas by electrostatic precipitation or other standard methods. This hot side dry sorbent injection is potentially attractive for retro-fitting existing power plants since no major structural alterations are required. U.S. Pat. Nos. 5,116,587, 5,114,898 and 5,114,691 to Pinnavaia and others describe the use of LDHs at temperatures above about 400° C. to remove $SO_x$.

Another evolving technology of flue gas cleanup involve the post-combustion sorbent injection. In this post-combustion gas cleanup, the sorbents are injected downstream of the boiler to capture $SO_2$. This cool-side desulfurization technology make use of the existing or modified duct work and particulate collection system (electrostatic precipitator or bag house) as the $SO_2$ capture zones, resulting in a low installed capital cost and short construction time relative to conventional wet scrubbing (FGD). Cool-side desulfurization, therefore, would be particularly well-suited for retrofit applications in coal burning power plants that lack adequate space for FGD installation or that have limited remaining boiler life.

Several calcium and sodium-containing sorbents have been evaluated for cool-side flue gas desulfurization process during the past few years. The publication by C Jorgensen, et. al., in *Environmental Progress*, vol. 6, pp. 26-32 (1987) has evaluated several of these sorbent compositions. Among these sorbents, the sodium containing compounds such as sodium bicarbonate and sodium carbonates were found to be highly effective in capturing $SO_x$ from flue gas streams. In addition, several pilot-scale commercial processes are presently under way to develop suitable methods for desulfurization of flue gases from coal-burning power plants. These processes include, injection of sorbents such as lime, hydrated lime, lime stone or their mixtures with sodium-containing sorbents such as sodium bicarbonates [lime dual alkali (LDA) or limestone dual alkali (LSDA) processes]. These sorbents are injected as dry sorbents into the filter bag house or to the duct work upstream of bag house (duct sorbent injection, DSI).

LDHs are a group of anionic clay minerals. These have positively charged sheets of metal hydroxides, between which are located anions and some water molecules. Most common LDHs are based on double hydroxides of such main group metals as Mg, and Al and transition metals such as Ni, Co, Cr, Zn and Fe etc. These clays have structure similar to brucite [$Mg(OH)_2$] in which the magnesium ions are octahedrally surrounded by hydroxyl groups with the resulting octahedra sharing edges to form infinite sheets. In the LDHs, some of the magnesium is isomorphously replaced by a trivalent ion, such as $Al^{3+}$. The $Mg^{2+}$, $Al^{3+}$, OH layers are then positively charged, necessitating charge balancing by insertion of anions between the layers.

One such anionic clay is hydrotalcite in which the carbonate ion is the interstitial anion, and has the idealized unit cell formula [$Mg_6Al_2(OH)_{16}$]($CO_3$).$4H_2O$ and referred to as $Mg_3Al$ —$CO_3$. However, the ratio of Mg/Al in hydrotalcite-like can vary between 1.7 and 4 and various other divalent and trivalent ions may be substituted for Mg and Al. In addition, the anion which is carbonate in hydrotalcite, can be replaced in synthesis by a large number of simple anions such as $NO_3^-$, $Cl^-$, $OH^-$, $SO_4^{2-}$ etc. These LDHs, based on their structure, fall into the Pyroaurite-Sjogrenite group, where brucite-like layers carrying a net positive charge alternate with layers in which the oxygen atoms of carbonate groups and water molecules are distributed on a single set of sites.

Hydrocalumite and related synthetic compounds also have a layered structure in which positively charged metal hydroxide layers alternate with the interlayers containing anions and water. The hydroxide layers contain specific combinations of metal ions derived from on one hand divalent calcium cations and on the other from trivalent cations of metals such as iron, or more particularly, aluminum. The interlayers contain anions such as $OH^2$, $SO_4^{2-}$, $Cl^-$, $NO_3^-$ and, in particular $CO_3^{2-}$. The general formula for the group is $[Ca_2M^{3+}(OH)_6]X.yH_2O$, where $M^{3+}$ is a tripositive ion and typically $Al^{3+}$, X is a singly charged anion or equal amounts of more highly charged ones, and y is between 2 and 6. As in the Pyroaurite-Sjogrenite group, principal layers alternate with interlayers, the principal layers having the composition $[Ca_2M^{3+}(OH)_6]^+$ and the inter-layers consisting of water molecules and anion X. However, because of the difference in size between the $Ca^{2+}$ and $Al^{3+}$ ions, the $M^{2+}:M^{3+}$ ratio is fixed at 2:1 and their arrangement is ordered. The only known natural mineral in the group is hydrocalumite the composition of which is approximately $[Ca_2Al(OH)_6](OH)_{0.75}(CO_3)_{0.125}.2.5H_2O$. However, there are many synthetic analogous such as $[Ca_2Fe(OH)_6](SO_4)_{0.5}.3H_2O$, $[Ca_2Al(OH)_6](OH).6H_2O$ etc.

The syntheses of LDHs are generally simple, and the so called "precipitation method" is most popular. If a carbonate-containing product is desired, then the aqueous solution of magnesium and aluminum salts, i.e., nitrate, or chloride, is added to a aqueous solution of sodium hydroxide-carbonate with good mixing at room temperature. The resulting amorphous precipitate is then heated for several hours at 60°–200° C. to obtain a crystalline material. Washing and drying complete the synthesis in quantitative yield. By employing this precipitation method, replacement of all or part of $Mg^{2+}$ with other $M^{II}$ions such as $Ca^{2+}$, $Zn^{2+}$, $Cu^{2+}$ etc., or replacement of $Al^{3+}$ with other $M^{III}$ions such as $Fe^{3+}$, $Cr^{3+}$ etc., is also possible.

Another important aspect of the synthesis of these materials is the variation of the nature of the interstitial anion. The preparation of hydrotalcite-like materials with anions other than carbonate in pure form requires special procedures, because LDH incorporates carbonate in preference to other anions. Most of the time the smaller anions are introduced to the LDH structure, via the precipitation method by using the desired aqueous anion solutions instead of carbonates. However, in these methods the syntheses have exclusively carried out in aqueous solutions under an anaerobic condition to prevent carbonate contamination from the atmospheric carbon dioxide.

Process for the synthesis of hydrotalcite-like clays also have been the subject of a number of patents. Miyata et. al. in U.S. Pat. Nos. 3,796,792, 3,879,523, and 3,879,525 describes hydrotalcite-like derivatives with both cationic layer and anionic substitution including the smaller transition metal anions like $CrO_4^{2-}$, $MoO_4^{2-}$, and $Mo_2O_7^{2-}$. Both composition and preparative methods are described, and the compositions are said to be useful for catalytic purposes, absorbents, desiccants and the like. Synthetic hydrotalcite-like derivatives with small anions, including anions of transition elements, and also large organic anions such as long chain aliphatic dicarboxylates, are shown to catalyze aldol condensation effectively.

Incorporation of larger anions, such as transition metal polyoxoanions in to the LDH gallery is not easy. This require ion-exchange techniques subsequent to the LDH synthesis. Pinnavaia and Kwon in *J. Am. Chem. Soc.*, 110, 3653 (1988) have demonstrated the pillaring of several polyoxometallates including $V_{10}O_{28}^{6-}$ into the hydrotalcite structure containing Zn and Al metal ions in the layers. In U.S. Pat. No. 4,452,244 by Woltermann disclosed the preparation of several polyoxometallate-LDHs. However, no XRD or analytical data were given to establish the purity of those materials. Recently, U.S. Pat. No. 4,774,212 by Drezdon and U. S. Pat. No. 5,079,203 by Pinnavaia have disclosed the preparation of several Mg/Al and Zn/Al hydrotalcite-like materials containing transition metal polyoxoanions. Several other methods of preparation of LDHs have been described in prior art publications, particular reference being made to following review journal articles by S. L. Suib et. al., in *Solid State Ionics*, 26, 77 to 86 (1988), and W. T. Reichel in *CHEMTECH*, 58 to 63 (1986). The exchange of gallery anions with other anions are exclusively done in aqueous solutions. All these ion exchange reactions have been performed in aqueous solutions. In this disclosure we perform solid-gas reactions involving hydrotalcite-like LDHs and sulfur containing gas streams, to replace gallery anions, especially $CO_3^{2-}$ anions from the LDHs, with sulfur-containing anions.

The nature of the thermal decomposition of LDHs, especially the hydrotalcite-like materials, have been studied in detail. For example, upon thermolysis, hydrotalcite $[Mg_6Al_2(OH)_{16}](CO_3).4H_2O$ loses weight in two stages. First, it loses the four interstitial water molecules when heated to 200° C., while retaining the skeletal hydroxide and the interlayer carbonate. Additional heating from 275° C. to 450° C. results in the simultaneous loss of hydroxyl groups and carbonate as water and carbon dioxide, respectively. Reichle in *J. Catal.* 101, 352 to 359 (1986) has shown that this heating of hydrotalcite was accompanied by an increase in the surface area from about 120 to about 230 $m^2$/g ($N_2$/BET) and a doubling of pore volume (0.6 to 1.0 $cm^3$/g, Hg intrusion). Further heating to higher temperatures causes lowering of surface area as well as reactivity. At 1000° C., the formation of MgO and the spinel phase, $MgAl_2O_4$ has been observed.

Thus, the thermal decomposition of LDHs leads to the formation of active metal oxides with fairly high basic character (pKa $\leq 35$) and high surface area. These thermally treated materials have exceptionally well-dispersed reactive metal centers, and these properties of LDHs have been utilized to develop new class of sorbents which performed as efficient sorbents for the flue gas desulfurization. The results of this work have been disclosed in our U.S. Pat. Nos. 5,116,587, 5,114,898 and 5,114,691. These patent disclosures specifically describe the use of transition metal promoted LDH compositions that are suitable for the hot-side flue gas desulfurization. The transition metals present in these sorbents oxidize $SO_2$ in flue gas at boiler temperatures to more reactive $SO_3$. These molecules showed better $SO_x$ absorptivities at temperatures above 500° C. and were an attractive class of sorbents for the furnace sorbent injection process to remove sulfur-containing gases. The transition metals that are capable of oxidizing $SO_2$ to $SO_3$ when incorporated into the LDH structure as layer ions or as gallery anions were disclosed in U.S. Pat. Nos. 5,079,203, 5,114,691, and U.S. Pat. Nos. 5,116,587 and 5,114,898, respectively. During the reaction of these LDHs at elevated temperatures, the basic $M^{2+}$ metal site, react with $SO_3$ to form thermally stable harmless metal sulfates $MSO_4$.

The sorbents described above are examples of "disposable" $SO_x$ sorbents. The $SO_x$ components in the spent sorbents are in the form of non hazardous refractory sulfate form such as $CaSO_4$ or $MgSO_4$ and thus suitable for the safe deposition. An economically attractive sorbent compositions would be the one that can be recycled. Recyclable absorbents would allow entrapped $SO_x$ to be released from the spent sorbents and isolate fresh sorbents for reuse, thus eliminating the need for landfill disposal. The released $SO_x$ can be used for sulfuric acid manufacture.

European Patent Application EP-A 278 535 has recently, described a catalyst composition suitable for the refining of heavy sulfur- and metal-containing petroleum feeds. Thus, the catalyst composition according to the disclosure contained a catalytically active zeolitic material such as ZSM-5, ZSM-11 etc. for the conversion of hydrocarbons, an anionic clay material with an LDH structure for the binding and removal of sulfur oxides, and a matrix material such as kaolin or alumina. Preferred catalyst-compositions contained 1 to 30 percent amounts of anionic clay compositions, based on total catalyst composition. These sorbents remove sulfur oxides from the gas streams of fluidized catalyst cracking (FCC) units operating at temperatures around 700° C. However, they are inefficient for rapidly capturing $SO_x$ from the flue gas of coal-burning power plants owing in part to the short contact time between the adsorbent and the flue gas.

OBJECTS

It is an object of the present invention to provide a method using LDH sorbent compositions that are suitable for cool-side application of flue gas desulfurization process in a coal-fired power plants which would capture $SO_2$ from gas streams at temperatures below 400° C. It is further an object of the present invention to provide a method wherein the spent sorbents obtained after the reaction of LDHs with $SO_2$ are then thermally treated and hydrolyzed in the absence of $SO_2$ gas, to regenerate to fresh sorbent compositions that are suitable for the reuse. These and other objectives will be increasingly apparent by reference to the following description and the drawings.

IN THE DRAWINGS

Figure 3:
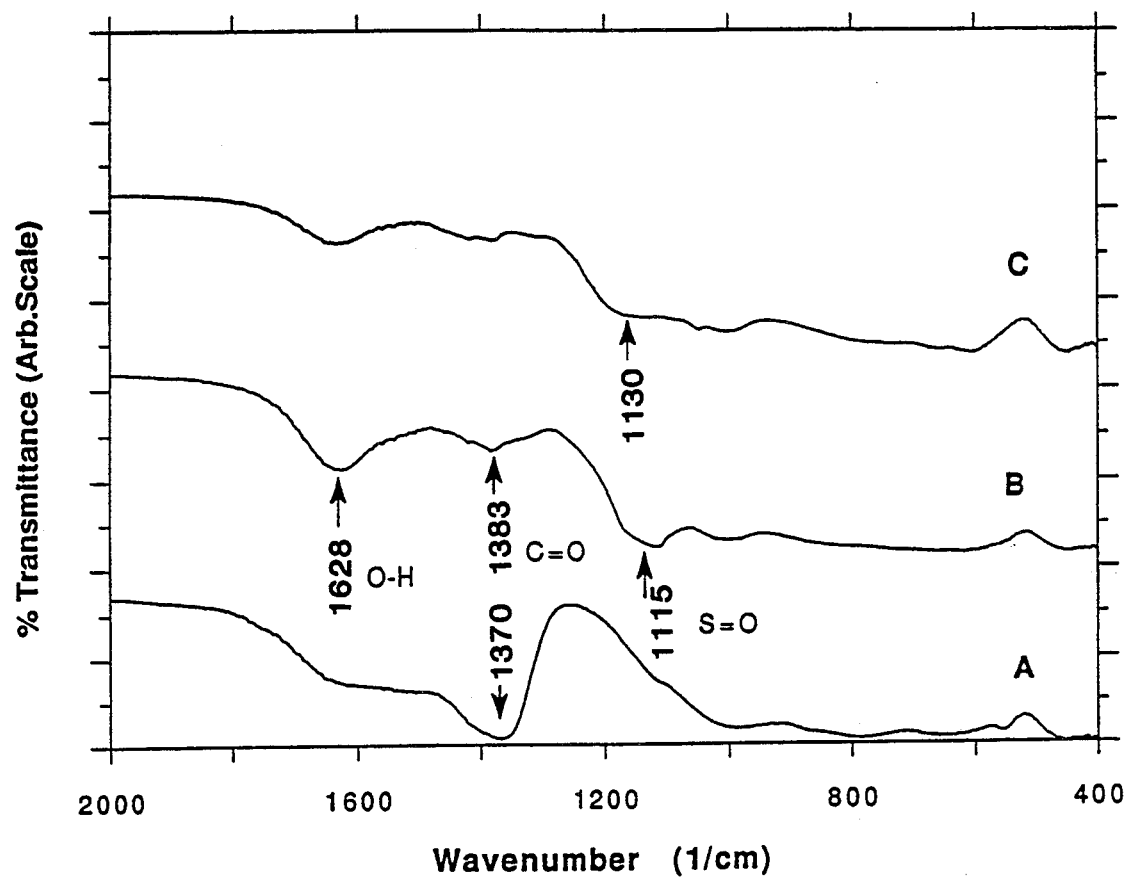

FIG. 3 is a graph which illustrates powder Fourier Transform Infrared (FT-IR) spectra showing the disappearance of carbonate ions from the LDH structure and formation of sulfite anions upon exposure of hydrotalcite to a gas stream containing 0.5 wt. % $SO_2$. (A) $Mg_3Al$—$CO_3$ at ambient temperature, (B) $Mg_3Al$—$CO_3$ calcined to 200° C. and exposed to $SO_2$ for 1 h, and (C) above sample (B) after hydrolysis and drying at 150° C.

GENERAL DESCRIPTION

The present invention relates to a process for removing sulfur oxides from flue gases of coal-burning power plants and other gas streams which comprises contacting said gas streams with a heated sorbent composition at a temperature between 100° C. and less than 400° C., wherein said sorbent before being heated is selected from the group consisting of layered double hydroxides and wherein that sorbent composition has a layered structure of the formula:

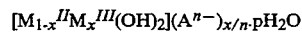

$[M_{1-x}{}^{II}M_x{}^{III}(OH)_2](A^{n-})_{x/n}.pH_2O$ wherein $M^{II}$ is a divalent metal and $M^{III}$ is a trivalent metal, A is an anion of charge n—, and x is between 0.8 to 0.12, and p is a positive number. The present invention also relates to a process of regenerating the spent sorbent after the reaction with sulfur oxides-containing gas streams, by heating the spent sorbent to a temperature of 500° C. and exposing the calcined product to water to reconstitute the sorbent composition to obtain the layered double hydroxide structure.

In this present invention, we introduce a new class of sorbent compositions that are suitable for the cool-side flue gas desulfurization process in coal-fired power plants. These sorbents have completely different chemical and physical properties than calcium or sodium-containing sorbents that are being currently used. The sorbents that are employed in this invention belong to a group of clay mineral that consisted of a layered structures, and these materials are commonly known as layered double hydroxides (LDHs). These are synthetic clays having basic properties and are capable of adsorbing acid anhydrides such as $SO_2$ and $SO_3$ into their layered structures. These sorbent compositions give good $SO_x$ reactivity in the temperature range between 100° to 400° C., and thus are suitable for post combustion applications in the coal burning power plants.

This invention discloses the reactivity of LDH sorbents with $SO_2$ at temperatures in the range 100 and less than 400° C., such that the sulfur dioxide binds into the gallery of the LDH structure by replacing a part or all of the initial gallery anion $A^{n-}$, particularly when the initial gallery ions are carbonate. These compositions find particular use in diminishing the emissions of sulfur oxides from the coal-fired boilers.

In a broader sense this invention considers the use of these LDH sorbents in controlling the sulfur oxides from gas streams, more particularly from coal-fired boiler systems. These systems include a boiler, economizer and dust collectors such as electrostatic precipitator or bag filter house ("bag house"). The injection of the sorbents into these, particularly to the duct work down stream of boiler and to the bag house or to the electrostatic precipitators operating at temperatures, between 100° and less than 400° C., has been considered in this invention. Thus, the LDH sorbents were thermally treated in a temperature-programmed thermogravimetric balance at a temperature in the range of 100° to 400° C. in a stream of air or nitrogen, and $SO_2$ gas was introduced. The amount of $SO_2$ that reacted with the sorbents was monitored as the weight uptake. The reaction of thermally activated hydrotalcite, $Mg_3Al$—LDH with $SO_2$ provided a general description of the typical experimental method used in this invention to investigate the reactivity. $Mg_3Al$—LDH was heated to the reaction temperature, 200° C., under a stream of air in a temperature-controlled thermogravimetric balance at a rate of 5° C./min. The sample was calcined at 200° C. for an additional one hour (Step 1 in FIG. 1). During the above calcination process the sample lost weight (14.7%) due to the removal of gallery $H_2O$ and some $CO_2$. This calcined sample was then exposed to a $SO_2$-containing stream of air at 0.5% v/v concentration, at a flow rate of 200 ml/min. for 1 h (Step 2 in FIG. 1). A weight gain of 3% was observed. After 1 h reaction the addition of $SO_2$ to the gas stream was discontinued, and the change in the sample weight was monitored for another 1 h (Step 3 in FIG. 1) in order to determine the thermal stability of the products formed at the reaction temperature, in the absence of $SO_x$. The product formed show slow weight loss in the absence of $SO_2$ which may be due to the further release of water from the clay gallery.

Figure 2:
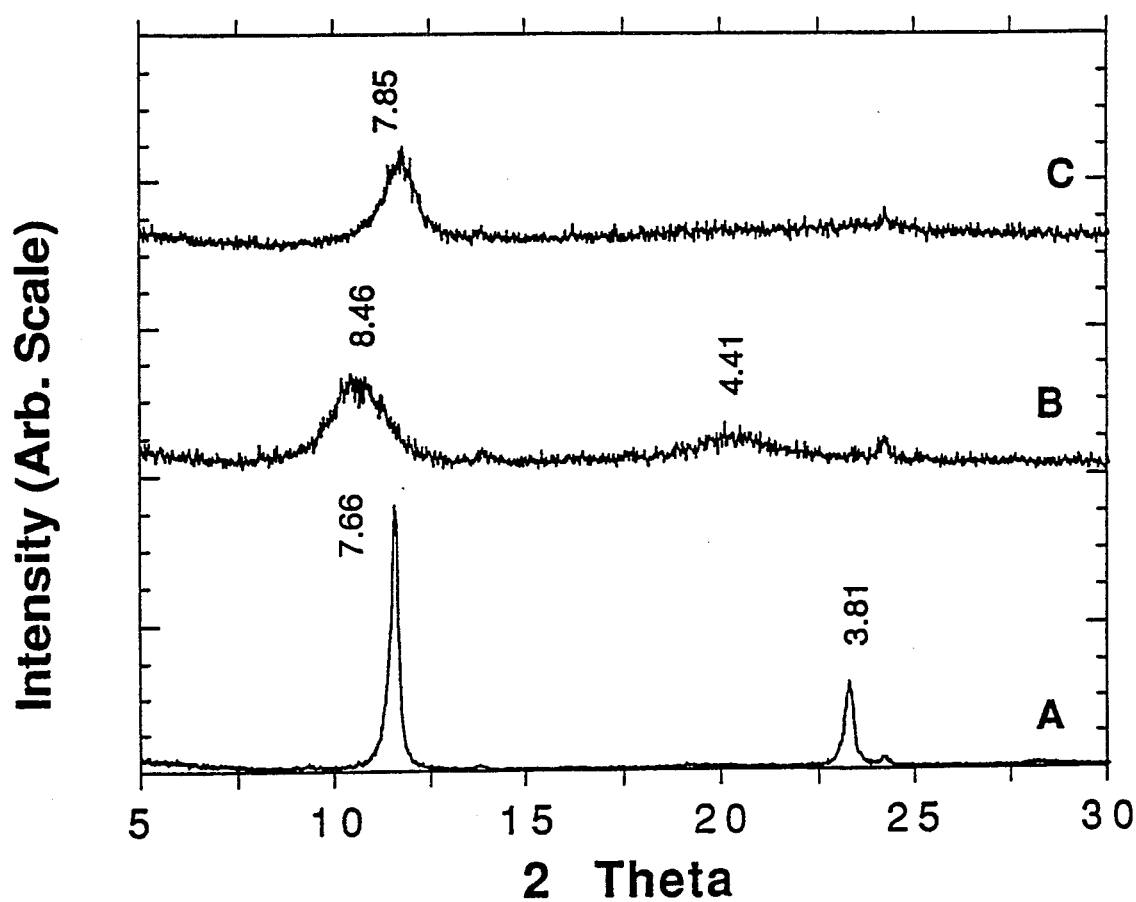
FIG. 2 is a graph which illustrates X-ray Powder diffraction patterns of (A) $Mg_3Al$—$CO_3$ at ambient temperatures, (B) $Mg_3Al$—$CO_3$ heated to 200° C. and exposed to. $SO_2$ for 1 h and (C) above sample (B) after hydrolysis and drying at 150° C. showing the formation of a $SO_3^{2-}$ intercalated LDH species upon exposing calcined hydrotalcite to a $SO_x$ containing gas stream.

The X-ray powder diffraction pattern of the final product confirmed the presence of the layer structure with initial $d_{001}$ peak of hydrotalcite shifting from 7.6 to 8.4 (FIG. 2). The initial basal spacing of 7 6 Å correspond to the $CO_3^{2-}$ anion intercalated $Mg_3Al-LDH$. This increase in the basal spacings was attributed to the formation of either $SO_3^{2-}$ or $SO_4^{2-}$ anions in the LDH galleries. For comparison, $Mg_3Al-SO_3^{2-}$ has a basal spacing of 7.8 Å whereas, $Mg_3Al-SO_4^{2-}$ has a basal spacing of 8.1 Å. Formation of magnesium sulfite or other sulfate species was not observed in the x-ray powder diffraction patterns. The hydrolysis of this spent sorbent at 150° C., which should convert any entrapped $SO_x$ as $SO_3^{2-}$, resulted in a basal spacing change from 8.4 Å to 7.8 Å after air-drying. (FIG. 2C). This d-spacings of 7.8 Å corresponds to the $SO_3^{2-}$ intercalated $Mg_3Al-LDH$.

The presence of $SO_3^{2-}$ anions in the LDH gallery is also evident from its IR spectrum (FIG. 3). The intensed $C=O$ stretching band observed for uncalcined hydrotalcite at 1370 cm$^{-1}$ is weakened after exposed to $SO_2$ and shows a broadened $S=O$ stretching band centered at 1115 cm$^{-1}$ due to the formation of $SO_3^{2-}$ anions (FIG. 3B) The hydrolyzed spent sorbent also show weakened $C=O$ bands and a broadened $S=O$ band centered at 1130 cm$^{-1}$ (FIG. 3C). These results from both XRD and FTIR experiments confirm the formation of gallery $SO_3^{2-}$ anions Similar reactivities were observed when the $SO_x$-containing gas is contacted with hydrotalcite at temperature range of 100°–400° C.

At temperatures higher than 400° C., the LDH layers are no longer intact and sorbents undergo structural changes to form mixed metal oxide solid solutions. These mixed metal oxides containing MgO and $Al_2O_3$ react with $SO_2$ at temperatures above 500° C. to form $MgSO_4$. The reactivity of these LDH sorbents at temperatures above 500° C. have been disclosed in our earlier patents, U.S. Pat. Nos. 5,114,898 and 5,116,587.

It is thus concluded that at relatively low temperatures (100° and less than 400° C.), including conditions where the hydrotalcite layers are intact, the $SO_2$ gas reacts with gallery $CO_3^{2-}$ ions to form $SO_3^{2-}$ anions and $CO_2$ gas according to the following overall reaction;

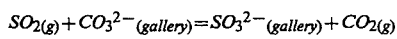

$$SO_{2(g)} + CO_3^{2-}{}_{(gallery)} = SO_3^{2-}{}_{(gallery)} + CO_{2(g)}$$

In this manner $SO_x$ components from the gas streams are get entrapped in the LDH structures. The weight gain of 3% observed upon exposing the calcined hydrotalcite to $SO_2$ containing air corresponded to the amount of $SO_2$ adsorbed in the LDH gallery. This weight increase corresponds to 80% replacement of $CO_3^{2-}$ anions from the clay gallery by $SO_3^{2-}$ anions.

Similar $SO_x$ absorption reactivity was observed for $Mg_3Fe-CO_3$ in which all of $Al^{3+}$ sites have been replaced by $Fe^{3+}$, or $Mg_{0.8}M^{II}{}_{2.2}Al-CO_3$ where part of the Mg ions in hydrotalcite are replaced by different transition metal ions such as $Cu^{2+}$, $Ni^{2+}$, $Co^{2+}$, $Mn^{2+}$ and $Fe^{2+}$. All of these Mg-containing sorbents showed more than 90% replacement of gallery $CO_3^{2-}$ anions with $SO_3^{2-}$ anions when exposed to $SO_x$ containing gas streams in the temperature range of 100°–400° C. These result also suggest that, the gallery ion-exchange reaction does not influenced by the types of layer ions present.

In another embodiment, the Ca-containing LDH, $Ca_3Al-CO_3$, also reacted with $SO_2$-containing gas at 200° C. The weight uptake was found to be 2%. The FT-IR spectrum of the reacted material exhibited bands around 1116 cm$^{-1}$ due to the formation of $S=O$ species in the spent sorbent. This weight uptake corresponded to the conversion of 60% gallery $CO_3^{2-}$ anions to $SO_3^{2-}$. Similar uptake results were observed for other Ca-containing LDHs such as $Ca_3Al_{x-y}Fe_y-CO_3$ where some of $Al^{3+}$ sites are replaced by $Fe^{3+}$.

In another example disclosed in this invention, the regeneration of these spent LDH sorbents is described. In a preferred process the spent sorbents after exposure to $SO_x$ are calcined to 500° C. for one to three hours. During this process the entrapped $SO_x$ component is removed from the LDH structure as sulfur oxides such as $SO_2$ and $SO_3$ and the LDH structure is destroyed to form amorphous mixed metal oxide solid solutions. The hydrolysis of this calcined product in the presence of $CO_2$ or $CO_3^{2-}$ anions reconstitute the hydrotalcite-like structure. The XRD pattern of the product isolated confirmed the formation of hydrotalcite structure with a d-spacing of 7.6 Å.

In the absence of a source of $CO_3^{2-}$ the calcined product converts to meixnerite, $[Mg_3Al(OH)_8]OH \cdot x-H_2O$ with a LDH structure containing gallery $OH^{31}$ and a basal spacing of 8.1 Å. A description of reconstruction of calcined LDHs by hydrolysis is disclosed in our previous invention, U.S. Pat. No. 5,079,203. The meixnerite thus formed also is suitable for capturing $SO_x$ from other gas streams at temperatures in the range 100° to less than 400° C. Therefore, the $Mg_3Al-SO_3$ formed by the adsorption of the $SO_2$ gas at temperatures below 500° C. can be regenerated, and can be reused in the form of meixnerite. In this case the $SO_x$ is trapped in the LDH galleries according to the following overall reaction;

$$SO_{2(g)} + OH^-{}_{(gallery)} = HSO_3^-{}_{(gallery)}.$$

The compositions disclosed in the present invention may be synthesized from inexpensive starting materials. For example, hydrotalcite-like materials can be prepared starting with MgO and sodium aluminates. Hydrocalumite-like materials or other Ca/Al containing LDHs can be prepared from CaO and sodium aluminates. Transition metal ions can be incorporated during the syntheses using metal ion solutions. Both CaO and MgO can be obtained by calcining natural minerals such as calcite ($CaCO_3$) and magnesite ($MgCO_3$). Using dolomite ($CaMgCO_3$) one can prepare products containing mixtures of Mg and Ca LDH phases. Some layered double hydroxides, such as hydrotalcite, are commercially available and some may be naturally occurring.

The form (i.e., particle size) and the texture of the present sorbent, are not critical to the present invention and may vary, depending, for example, on the type of preparation method. However, it is preferred that the particle size be less than 100 mesh size, for a rapid uptake of $SO_x$. Preferably the range is between 100 and 325 mesh.

Depending on whether $CO_3^{2-}$ or $OH^{31}$ occupies the gallery of the LDH, other acidic gases such as NO, $NO_2(NO_x)$, $CO_2$ and $Cl_2$ are also capable of adsorbing into the LDH structure, especially into the meixnerite, in the temperature range of 100°–400° C. For example, the $CO_2$ gas could be adsorbed by replacing gallery $OH^-$: $2OH^-_{(gallery)} + CO_2 = CO_3^{2-} + H_2O$, or $NO_2$ according to: $OH^{31}_{(gallery)} + 2NO_2 = NO_3^- + NO$, or $Cl_2$ according to: $CO_3^{2-}_{(gallery)} + HOCl + Cl_2 = CO_2 + H_2O + OCL^{31} + Cl^-$. Thus the LDH sorbents disclosed in this invention are also suitable for removing these components from gas streams. These gases can be trapped in the LDH structures as $NO_3^-$, $CO_3^{2-}$ or $Cl^-$ ions and the spent sorbent can be recycled in a manner similar to that disclosed in this invention by calcination and hydrolysis.

These sorbent particles may be formed by conventional techniques, such as spray drying, pilling, tableting, bead formation and the like.

In a coal-fired boiler application, the present sorbents may be added down stream of the boiler either to the duct work or into the filter bag house operating at temperatures in the range 100° to less than 400° C. The sorbents then react with sulfur oxides and other acidic anhydrides such as $NO_x$ present in the flue gas stream. The flue gas leaving the contacting zone have reduced amounts of sulfur oxide relative to the gas formed in the absence of the sorbents. The reacted sorbents can be collected from the bag house and regenerated for further application by employing the calcination and hydrolysis methods as disclosed in the invention.

The following examples will serve to illustrate certain embodiments of the herein disclosed invention. These examples should not, however, be construed as the limiting scope of the novel invention as there are many variations which may be made thereon without departing from the theme of the disclosed invention.

EXAMPLE 1

The preparation of a hydrotalcite-like Mg3Al-LDH is described in this example.

A solution of 12.8 g $Mg(NO_3)_2.6H_2O$ and 9.4 g $Al(NO_3)_3.9H_2O$ in 100 ml deionized water was added to a solution containing 14 ml 50% NaOH and 5 g $Na_2CO_3$ (anhydr.) in 200 ml distilled water. The addition was carried out very slowly over a period of 90 min. with vigorous stirring. Following the addition, the resulting heavy slurry was heated at 65°±5° C. for 18 hours with good mixing. The mixture was then cooled to room temperature, and the precipitate was separated by centrifugation. The solid was washed several times with deionized water until the washings were free of salts and then dried in air. The X-ray diffraction pattern of the dried solid corresponded to hydrotalcite, and the basal spacing was found to be 7.78 Å. Chemical analysis showed the Mg/Al ratio to be 3.2, very near the value expected for hydrotalcite with an idealized formula unit of $[Mg_3Al(OH)_8](CO_3)_{0.5}.xH_2O$.

EXAMPLE 2

The preparation of a hydrocalumite-like Ca2Al-LDH is described in this example.

A solution of 4.72 g $Ca(NO_3)_2.4H_2O$ and 3.75 g $Al(NO_3)_3.9H_2O$ in 50 ml deionized water was added dropwise to stirred 100 ml distilled water at 65° C. under an atmosphere of nitrogen. The pH of the reaction mixture was maintained at 10.5 by adding a 50% (w/w) solution of NaOH in water. The resulting white suspension was stirred for another 1 h. at 65° C. The mixture was then cooled to room temperature, and the precipitate was separated by centrifugation. The solid was washed several times with deionized water until the washings were free of salts and then dried in air. The X-ray diffraction pattern of the dried solid corresponded to a hydrocalumite-like structure with a basal spacing of 8.68 Å. Chemical analysis showed the Ca/Al ratio to be 2.2, very near the value expected for a LDH structure with an idealized formula unit of $[Ca_2Al(OH)_6](NO_3).xH_2O$.

EXAMPLE 3

The preparation of a Ca3Al-LDH is described in this example.

A solution of 4.72 g $Ca(NO_3)_2.4H_2O$ and 2.50 g $Al(NO_3)_3.9H_2O$ in 50 ml deionized water and a solution of 10 g NaOH and 0.25 g $Na_2CO_3$ (anhyd.) in 50 ml deionized water was added dropwise over a period of 45 min. to 50 ml distilled water at 65° C. The pH of the reaction mixture was maintained around 12.5. The resulting white slurry was stirred for another 1 h. at 65° C. The mixture was then cooled to room temperature, and the precipitate was separated by centrifugation. The solid was washed several times with deionized water until the washings were free of salts and then dried in air. The X-ray diffraction pattern of the dried solid corresponded to a layered structure with a basal spacing of 7.59 Å. The XRD also showed the presence of very small amounts of $CaCO_3$. Chemical analysis indicated the Ca/Al ratio to be 3.3, very near the value expected for LDH structure with an idealized formula unit of $[Ca_3Al(OH)_8](CO_3)_{0.5}.xH_2O$.

EXAMPLE 4

Hydrotalcite-like LDH sorbents with the general formula $[Mg_6Al_{2-x}Fe_x(OH)_{16}](CO_3).yH_2O$ in which some or all of the octahedral aluminum are replaced by iron were prepared according to this example.

The procedure was similar to that described in Example 1, except that a solution containing $Mg(NO_3)_2.6H_2O$, $Al(NO_3)_3.9H_2)$ and $Fe(NO_3)_3.9H_2O$ with different molar ratios, were added to the solution containing NaOH and $Na_2CO_3$. The X-ray powder diffraction patterns of the products corresponded to a hydrotalcite-like structure with a basal spacings between 7.6–7.9 Å. Mg: Al: Fe ratios were determined by chemical analyses.

EXAMPLE 5

Preparation of pyroaurite, a Mg3Fe-LDH of the type $[Mg_6Fe_2(OH)_{16}](CO_3).xH_2O$, is described in this example.

A solution containing 7.6 g $MgCl_2.6H_2O$ and 2.0 g $FeCl_3$ (anhyd.) in 100 ml deionized water was added to a solution of 1 g NaOH and 5.3 g $Na_2CO_3$ (anhydr.) in 500 ml distilled water. The addition was carried out very slowly over a period of 90 min. with vigorous stirring of the solution. The resulting pale brown heavy slurry was then heated to 65°±5° C. for 10 days with good stirring. (The reaction time can be minimized by heating to higher temperatures, without substantial loss of $SO_x$ uptake capabilities.) The mixture was then cooled to room temperature, and the precipitate was separated by centrifugation. The resulting pale brown solid was washed several times with deionized water until the washings were free of salts. The product was then dried in air. The X-ray diffraction powder pattern of the dried solid corresponded to the pyroaurite structure. The basal spacing was found to be 7.78 Å. Chemical analysis showed the Mg/Fe ratio to be 2.8.

EXAMPLE 6

The preparation of LDH sorbents of the type, [$M^{II}_{0.8}Mg_{2.2}Al(OH)_8$]($CO_3$)$_{0.5}$·$xH_2O$ where some of the $Mg^{2+}$ sites in hydrotalcite are replaced by $M^{II}$ transition metal ions are described in this example.

The procedure for the preparation of LDH sorbent where $M^{II}$ is Co is described here. The preparation of other LDH sorbents with different $M^{II}$ ions were also carried out using a similar procedure. A solution containing 1.35 g Co($NO_3$)$_2$·$6H_2O$, 4.0 g Mg($NO_3$)$_2$·$6H_2O$, 2.66 g Al($NO_3$)$_3$·$9H_2O$ in 50 ml deionized water and a solution of 2.25 g NaOH and 0.75 g $Na_2CO_3$ (anhyd.) in 50 ml deionized water was added dropwise over a period of 45 min. to 50 ml deionized water. The pH of the reaction mixture was maintained between 10–11. The resulting pink slurry was stirred for another 18 h. at 60° C. The mixture was then cooled to room temperature, and the precipitate was separated by centrifugation. The solid was washed several times with deionized water until the washings were free of salts and then dried in air.

By using a similar procedure and corresponding $M^{II}$ nitrate salts, $Mg^{2+}$ in hydrotalcite was partially replaced by other $M^{II}$ ions such as $Cu^{2+}$, $Mn^{2+}$, $CO^{2+}$ and $Ni^{2+}$. The incorporation of $Mn^{II}$ was carried out under anaerobic conditions to prevent oxidation of manganese hydroxide. The X-ray diffraction patterns of the dried solid samples corresponded to single phase layered structures with a basal spacings between 7.7–7.9 Å.

EXAMPLE 7

The LDH sorbents with the general formula [$Ca_6 Al_{2-x} Fe_x (OH)_{16}$]($CO_3$)·$yH_2O$ in which some or all of the octahedral aluminum are replaced by iron were prepared according to this example.

The procedure was analogous to Example 3, except that a solution containing Ca($NO_3$)$_2$·$4H_2O$, Al($NO_3$)$_3$·$9H_2O$ and Fe($NO_3$)$_3$·$9H_2O$ with different molar ratios, was added along with the solution containing NaOH and $Na_2CO_3$ to water at 65° C. The pH of the reaction mixture was maintained between 12–13. The X-ray powder diffraction patterns of the products corresponded to layered structures with basal spacings between 7.6–7.5 Å. Ca: Al: Fe ratios were determined by chemical analyses.

EXAMPLE 8

The uptake of $SO_x$ by various LDH sorbents was determined by thermogravimetric analysis using a Cahn Model TG-121 thermogravimetric analyzer.

Figure 1:
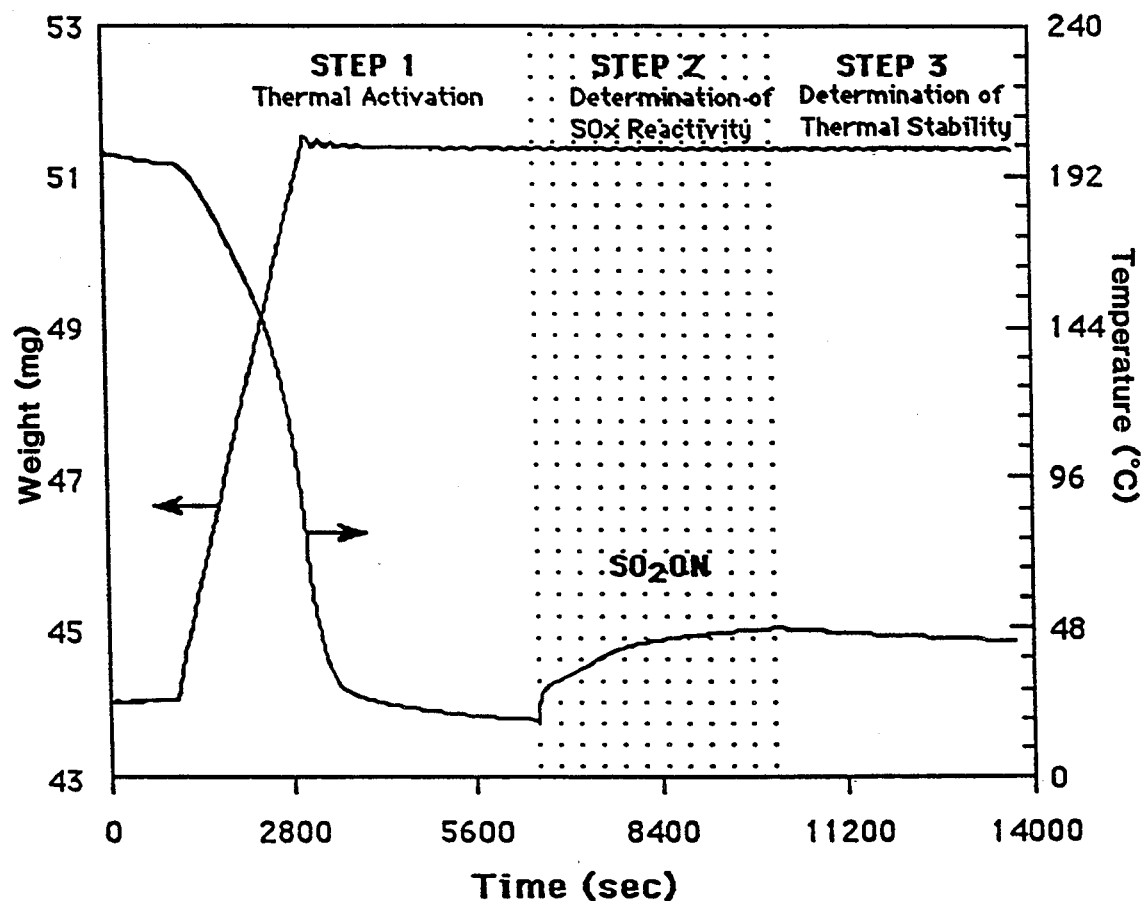
FIG. 1 is a graph of a thermogravimetric analysis (TGA) depicting the thermal activation of $[Mg_6Al_2(OH)_{16}]CO_3.H_2O$ to 200° C. and its reaction with $SO_2$ give a weight uptake due to the adsorption of $SO_x$ in the LDH structure.

Approximately 50 mg of the sorbent was placed on a quartz pan in the thermogravimetric balance. Subsequent treatment of the sample was carried out in a three-step procedure, as illustrated in FIG. 1 for the uptake of $SO_2$ by [$Mg_6Al_2(OH)_{16}$]$CO_3$·$xH_2O$:

Step 1: Under a flow of air as a carrier gas (200 ml/min.), the sample was allowed to equilibrate at 25° C. for 15 min. and then slowly heated (5° C./min.) to the calcining temperature, typically to 200° C. The sample was maintained at this temperature for an additional 1 h. to obtain a constant weight. This latter condition is needed to determine by weight the up take of $SO_2$ by the sorbent. Under applications in a boiler, however, it would not be necessary to thermally activate the sorbent.

Step 2: $SO_2$ gas (0.5%) was then introduced into the carrier gas at the reaction temperature and the weight was monitored for a 1 h period, (FIG. 1).

Step 3: Passage of $SO_2$ into the carrier gas was ceased and the sample weight at reaction temperature was monitored for another 1 h. This step was carried out in order to determine the thermal stability of the metal sulfate products formed after the reaction with $SO_x$.

The sorbents prepared according to the Examples 1–7 were tested in the temperature range of 100°–400° C. for their $SO_x$, reactivities. The Mg-containing sorbents showed weight uptakes between 3–4% by weight, which correspond to the replacement of 80–100% of the gallery $CO_3^{2-}$ anions to $SO_3^{2-}$ anions. The Ca-containing sorbents exhibited somewhat lower $SO_x$ uptake values. The uptake values obtained for Ca-containing sorbents were in the range 2–3% and corresponded to the conversion to 50–70% $SO_3^{2-}$ anions in the LDH gallery.

EXAMPLE 9

The following example describes the regeneration of the spent sorbents.

A 50 mg quantity of spent $Mg_3Al$—$CO_3$, obtained after exposing the sorbent to a stream of $SO_2$ containing gas, was calcined to 500° C. in a stream of nitrogen gas for 1 h. The product obtained was cooled to ambient temperatures under nitrogen and added into a 50 ml solution containing 20 mg of $Na_2CO_3$. The slurry was stirred at 65° C. for 1 day. The slurry was filtered to isolate the white precipitate and washed twice with 50 ml of water and dried in air. The X-ray diffraction pattern of a oriented film sample of this material showed the presence of layered hydrotalcite structure, with a d-spacings of 7.6 Å. Alternatively, the sorbent could be regenerated by passing water vapor over the sample to form mixnerite, the LDH containing $OH^-$ in the gallery, or water vapor-carbon dioxide mixture to form hydrotalcite, the regenerated sorbent containing $CO_3^{2-}$ in the galleries.

It is intended that the foregoing description be only illustrative of the present invention and that the present invention be limited only by the hereinafter appended claims.

We claim:

1. A process of removing $SO_x$, components from a gas stream which comprises contacting:
    (a) contacting the said gas stream with a heated sorbent composition at a temperature of between 100° C. and less than 400° C. wherein the said sorbent before being heated is selected from the group consisting of a layered double hydroxide composition of formula:

$$[M^{II}_{1-x}M^{III}_x(OH)_2](A^{n-})_{x/n} \cdot pH_2O$$

wherein $M^{II}$ is a divalent metal cation, $M^{III}$ is a trivalent metal cations, A is an interlayer anion of charge n- selected from the group consisting of $CO_3^{2-}$, $NO_3^-$ and $OH^-$ which reacts with the components in said gas stream to form sulfur containing anions containing said components, p is moles of water and x is between 0.8 and 0.12; and (b) regenerating the sorbent composition by heating to convert the sulfur containing anions to $SO_x$ and removing them from the composition.

2. The process of claim 1 characterized in that, the $M^{II}$ is an alkaline earth metal cation alone and with other of the metal cations.

3. The process of claim 2 wherein said $M^{II}$ the alkaline earth metal cation selected from the group consisting of magnesium or calcium cations.

4. The process of claim 1 wherein said $M^{III}$ cation is selected from Group consisting of IIIA metal cations alone and with other of the metal cations.

5. The process of claim 4 wherein said Group IIIA metal cation is an aluminum cation.

6. The process of claim 1 wherein said $M_{II}$ and $M^{III}$ are in part selected form transition metals cations.

7. A process of claim 1 characterized in that the anion A is selected from the group consisting of $CO_3^{2-}$, $NO_3^-$, and $OH^-$ and mixture thereof.

8. The process of claim 1, wherein the said layered double hydroxide composition after reaction with sulfur oxides at 100°–400° C. to form sulfur containing anions is heated to temperatures above 400° C., to remove the entrapped sulfur containing anions as sulfur oxides and then the heated sorbent is hydrolyzed in the presence of a compound containing the $A^{n-}$ anion needed to regenerate the said sorbent composition in claim 1.

9. The process of claim 8, wherein the anion $A^{n-}$ is $CO_3^{2-}$.

10. The process of claim 1 wherein the said gases are from a coal burning power plant downstream of the boiler.

11. The process of claim 10, wherein the flue gases are contacted in an electrostatic precipitator or in a bag house of a coal-burning power plant.

12. The process of claim 1 wherein said layered double hydroxide composition after reaction with sulfur oxides at 100°–400° C. to form sulfur containing anions is heated above 400° C. to remove the entrapped sulfur containing anions as sulfur oxides and then the heated sorbent is hydrolyzed to regenerate a sorbent composition in which $A^{n-}$ is $OH^-$.

* * * * *

UNITED STATES PATENT AND TRADEMARK OFFICE
CERTIFICATE OF CORRECTION

PATENT NO. : 5,358,701
DATED : October 25, 1994
INVENTOR(S) : Thomas J. Pinnavaia and Jayantha Amarasekera It is certified that error appears in the above-indentified patent and that said Letters Patent is hereby corrected as shown below:

On the Title Page, item [56], under "References Cited", "3,984,523 "3,984,523 10/1976 Schafer et al. .........923/240" should be inserted.

Column 2, line 45, "OH" should be --$OH^-$--.

Column 7, line 16, "7 6 Å" should be --7.6 Å--.

Column 8, line 36, "$OH^{31}$" should be --$OH^-$--.

Column 8, line 45, "$SO_x$" should be --$SO_2$--.

Column 9, line 4, "$OH^{31}$" should be --$OH^-$--.

Column 9, line 11, "$OH^{31}$" should be --$OH^-$--.

Column 9, line 13, "$OCL^{31}$" should be --$OCl^-$--.

Column 10, line 44, "$9H_2$)" should be --$9H_2O$--.
Column 13, line 16 (Claim 6), "form" should be --from--.

Signed and Sealed this

Twenty-eight Day of February, 1995

Attest:

BRUCE LEHMAN

*Attesting Officer*     *Commissioner of Patents and Trademarks*